(12) United States Patent
Barkan et al.

(10) Patent No.: US 7,059,528 B2
(45) Date of Patent: Jun. 13, 2006

(54) SYNCHRONOUS AND RESONANT DRIVES FOR PRODUCING MULTIPLE SCAN LINE PATTERN FOR ELECTRO-OPTICALLY READING INDICIA

(75) Inventors: Edward Barkan, Miller Place, NY (US); Howard Shepard, Great River, NY (US); Mark E. Drzymala, Commack, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 96 days.

(21) Appl. No.: 10/835,646

(22) Filed: Apr. 30, 2004

(65) Prior Publication Data

US 2005/0242187 A1 Nov. 3, 2005

(51) Int. Cl.
*G02B 26/00* (2006.01)
*G06K 7/10* (2006.01)

(52) U.S. Cl. ............................. 235/462.37; 235/462.01
(58) Field of Classification Search ........... 235/462.37, 235/462.01
See application file for complete search history.

(56) References Cited

U.S. PATENT DOCUMENTS

| 4,409,470 A | * | 10/1983 | Shepard et al. | ........ 235/462.35 |
| 4,816,661 A | * | 3/1989 | Krichever et al. | ..... 235/462.38 |
| 5,504,318 A | * | 4/1996 | Joseph et al. | ................ 235/454 |

* cited by examiner

*Primary Examiner*—Thien M. Le
*Assistant Examiner*—Lisa M. Caputo
(74) *Attorney, Agent, or Firm*—Kirschstein, et al.

(57) ABSTRACT

A raster pattern for reading bar code symbols is created by successively reflecting a light beam off scan mirrors oscillated respectively by a resonant motor drive and by another motor drive driven synchronously with the resonant drive.

17 Claims, 4 Drawing Sheets

SYNCHRONOUS AND RESONANT DRIVES FOR PRODUCING MULTIPLE SCAN LINE PATTERN FOR ELECTRO-OPTICALLY READING INDICIA

BACKGROUND OF THE INVENTION

1. Field of the Invention

The present invention generally relates to an arrangement for, and a method of, reading indicia such as bar code symbols and, more particularly, to the use of synchronous and resonant drives for producing a multiple scan line raster pattern to read the symbols.

2. Description of the Related Art

Various electro-optical systems or readers have been developed for reading indicia such as bar code symbols appearing on a label or on a surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the pattern of the graphic indicia into a time-varying electrical signal, which is digitized and decoded into data relating to the symbol being read.

Typically, a laser beam from a laser is directed along a light path toward a target that includes the bar code symbol on a target surface. A moving-beam scanner operates by repetitively sweeping the laser beam in a scan line or a series of scan lines across the symbol by means of motion of a scanning component, such as the laser itself or a scan mirror disposed in the path of the laser beam. Optics focus the laser beam into a beam spot on the target surface, and the motion of the scanning component sweeps the beam spot across the symbol to trace a scan line across the symbol. Motion of the scanning component is typically effected by an electrical drive motor.

The readers also include a sensor or photodetector which detects light along the scan line that is reflected or scattered from the symbol. The photodetector or sensor is positioned such that it has a field of view which ensures the capture of the reflected or scattered light, and converts the latter into an electrical analog signal.

In retroreflective light collection, a single optical component, e.g., a reciprocally oscillatory mirror, such as described in U.S. Pat. No. 4,816,661 or U.S. Pat. No. 4,409,470, both herein incorporated by reference, sweeps the beam across the target surface and directs the collected light to the sensor. In non-retroreflective light collection, the reflected laser light is not collected by the same optical component used for scanning. Instead, the sensor is independent of the scanning beam, and has a large field of view so that the reflected laser light traces across the sensor.

Electronic control circuitry and software decode the electrical analog signal from the sensor into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process usually works by applying the digitized signal to a microprocessor running a software algorithm, which attempts to decode the signal. If a symbol is decoded successfully and completely, the decoding terminates, and an indicator of a successful read (such as a green light and/or audible beep) is provided to a user. Otherwise, the microprocessor receives the next scan, and performs another decoding into a binary representation of the data encoded in the symbol, and to the alphanumeric characters so represented. Once a successful read is obtained, the binary data is communicated to a host computer for further processing, for example, information retrieval from a look-up table.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) per unit length is referred to as the density of the symbol. To encode the desired sequence of the characters, a collection of element arrangements is concatenated together to form the complete bar code symbol, with each character of the message being represented by its own corresponding group of elements. In some symbologies, a unique "start" and "stop" character is used to indicate when the bar code begins and ends. A number of different bar code symbologies is in widespread use including UPC/EAN, Code 39, Code 128, Codeabar, and Interleaved 2 of 5.

In order to increase the amount of data that can be represented or stored on a given amount of target surface area, several more compact bar code symbologies have been developed. One of these code standards, Code 49, exemplifies a "two-dimensional" symbol by reducing the vertical height of a one-dimensional symbol, and then stacking distinct rows of such one-dimensional symbols, so that information is encoded both vertically as well as horizontally. That is, in Code 49, there are several rows of bar and space patterns, instead of only one row as in a "one-dimensional" symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but of a matrix array made up of hexagonal, square, polygonal and/or other geometric shapes, lines, or dots. Such symbols are described in, for example, U.S. Pat. No. 5,276,315 and U.S. Pat. No. 4,794,239. Such matrix code symbologies may include Vericode, Datacode, and MAXICODE.

It is also known to scan two-dimensional symbols by successively reflecting the laser beam off two scan mirrors, each driven by a separate drive motor. The beam is deflected by one scan mirror in the horizontal (X) direction along one direction of the symbol, and is deflected by the other scan mirror in the vertical (Y) direction along another direction perpendicular to the one direction, thereby creating a multiple scan line pattern, also known as a raster pattern, across the entire width and entire height of the symbol.

The drive motors of the prior art are identical, even though the raster pattern places different requirements on the motors. The drive circuitry for these identical motors is expensive and complex because it requires a separate drive microprocessor, a pair of digital to analog converters, a pair of high current drive amplifiers, and a pair of optical feedback circuits in order to create a raster pattern that is stable and repeatable from one reader to the next. The drive circuitry is required to drive the identical motors over a broad range of frequencies and amplitudes, while making them efficient enough to respond to different drive frequencies without using too much electrical current to minimize power consumption.

SUMMARY OF THE INVENTION

Objects of the Invention

Accordingly, it is a general object of this invention to avoid the above drawbacks of the prior art.

It is a general object of the present invention to provide an improved drive circuit for generating a stable and repeatable raster pattern for reading indicia.

It is another object of the invention to reduce the complexity, cost and power consumption of such drive circuits.

It is a further object of the present invention to optimize the different operations of different motor drives.

FEATURES OF THE INVENTION

In keeping with the above objects and others which will become apparent hereinafter, one feature of the present invention resides, briefly stated, in an arrangement for, and a method of, electro-optically reading indicia, such as two-dimensional bar code symbols, by emitting a light beam from a light source, and by successively reflecting the light beam from a first scan mirror and a second scan mirror along first and second directions respectively across the symbol to be read. The first and second scan mirrors are respectively oscillated by first and second drives which, in contrast to the prior art, are not identically operated.

In accordance with this invention, the first drive is operative in a self-resonating mode to oscillate the first scan mirror at a resonant frequency, and the second drive is operative in a driven mode to oscillate the second scan mirror at a driven frequency. A controller is operatively connected to the drives, for driving the second drive in synchronism with the first drive to produce a scan pattern of multiple scan lines across the indicia with a given frequency relationship between the driven frequency and the resonant frequency.

Driving the first drive at its resonant frequency greatly reduces its power consumption. Driving the second drive synchronously with the first drive insures that the scan pattern will be stable and repeatable from one reader to the next.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

As used in this specification and in the appended claims, the term "indicia" broadly encompasses not only symbol patterns composed of alternating bars and spaces of various widths commonly referred to as bar code symbols, but also other one- or two-dimensional graphic patterns, as well as alphanumeric characters. In general, the term in "indicia" may apply to a type of pattern or information which may be recognized or identified by scanning a light beam and by detecting reflected or scattered light as a representation of variations in light reflectivity at various points of the pattern or information. A bar code symbol is one example of an "indicia" which the present invention can scan.

Figure 1:
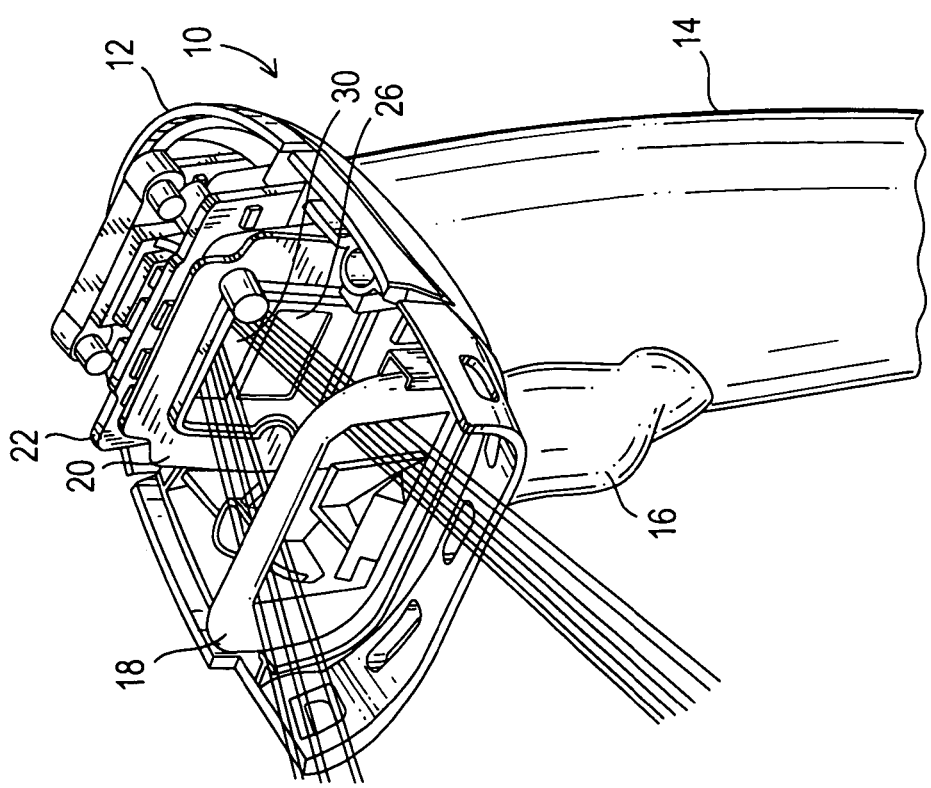
FIG. 1 is a broken-away, perspective view of a triggered bar code reader with a handheld housing for use with the present invention.

As a preferred embodiment, the implementation of the present invention in a handheld reader 10, as illustrated in FIG. 1, is described. The reader 10 includes a housing 12 having a handle 14 on which a trigger switch 16 is mounted. The housing includes a canopy above the handle, but removed for clarity from FIG. 1.

Figure 4:
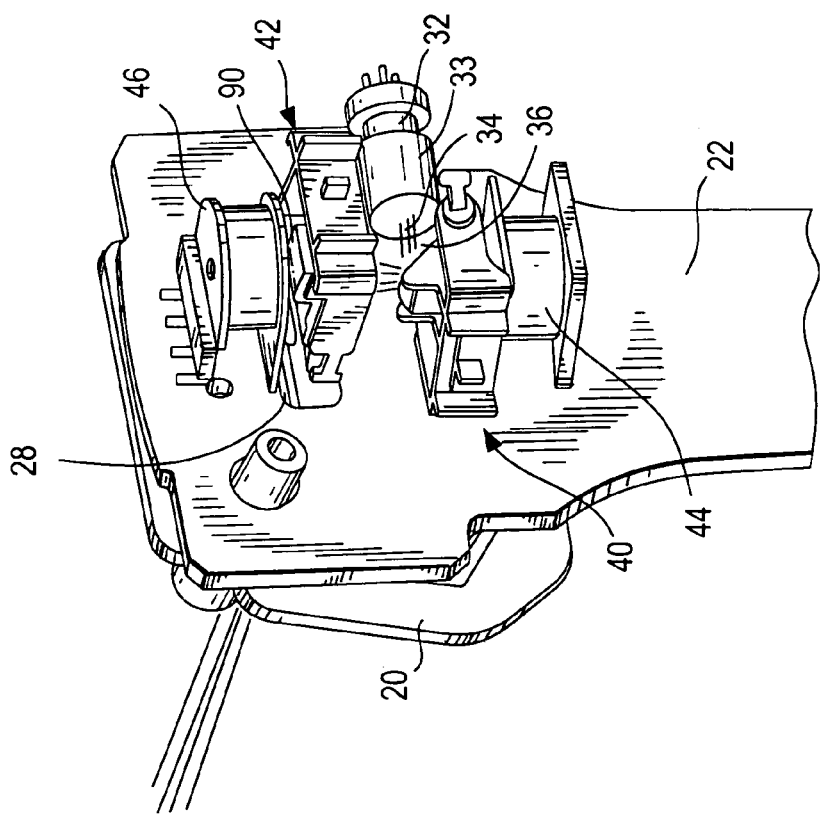
FIG. 4 is a broken-away, enlarged, perspective view of FIG. 3 with parts removed for clarity.

A window module 18 is situated adjacent a front end of the housing. An optical module 20 is situated behind the window module 18. A printed circuit board (PCB) 22, whose front side is shown more clearly in FIG. 2, and whose rear side is shown more clearly in FIGS. 3–4, is situated behind the optical module 20 at a rear end of the housing. The PCB slides into the handle 14 at an obtuse angle relative to a horizontal plane to accommodate the slanted-back slope of the handle.

Figure 2:
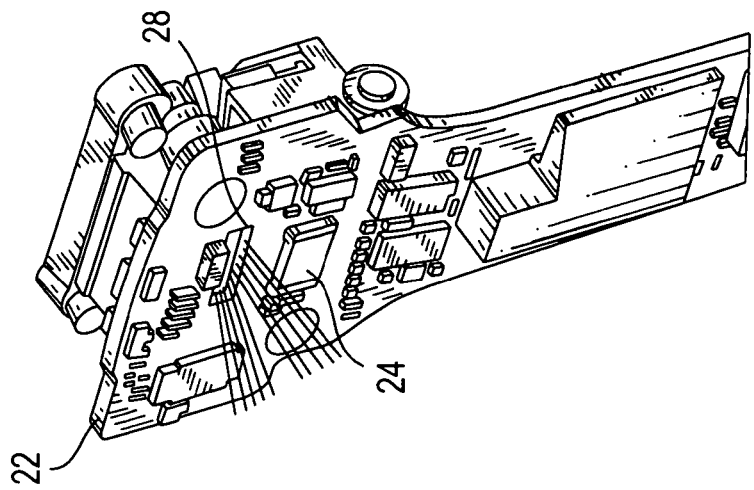
FIG. 2 is a broken-away, perspective view of parts of the reader of FIG. 1 with the housing and other parts removed for clarity.
Figure 3:
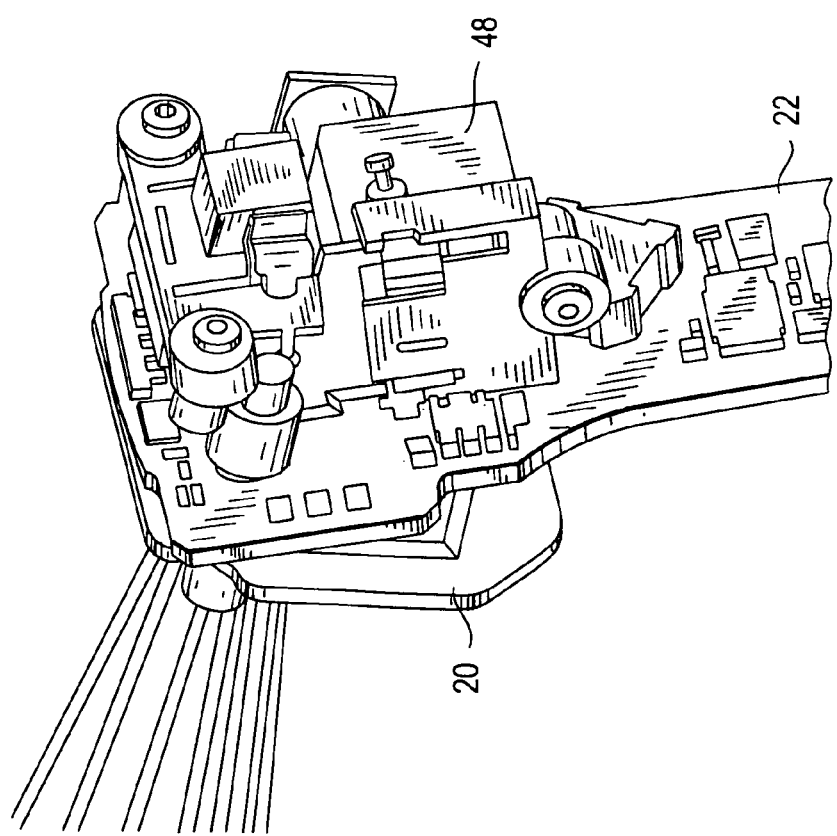
FIG. 3 is a broken-away, enlarged, perspective view of FIG. 2 as seen from its rear.

As shown in FIG. 2, a sensor 24 is mounted on the front side of the PCB. Light returning from a symbol being read passes through the window module 18 through a collection lens and filter 26 in the lower part of the optical module 20 to the sensor 24 for detection. As described below, light from a light source passes through an aperture 28 in the PCB through another aperture 30 in the upper part of the optical module 20 and, in turn, through the window module 18 en route to the symbol for reflection therefrom.

FIGS. 3–4 are similar, except that various supporting structures shown in FIG. 3 have been removed to better see the components supported thereby. Thus, as best seen in FIG. 4, a light source, such as a semiconductor laser 32 is mounted at the rear side of the PCB 22 and is operative for emitting a laser beam 34 horizontally through a focusing lens assembly 33 to a first scan mirror 36 for reflection upwardly to a second scan mirror for reflection forwardly through the aperture 28. The first scan mirror 36 is, as described more fully below, mounted for reciprocal oscillation by a first motor drive 40 operating in a self-resonant mode, while the second scan mirror is also mounted for reciprocal oscillation by a second motor drive 42 operating in a driven mode synchronous with the first motor drive 40.

Figure 8:
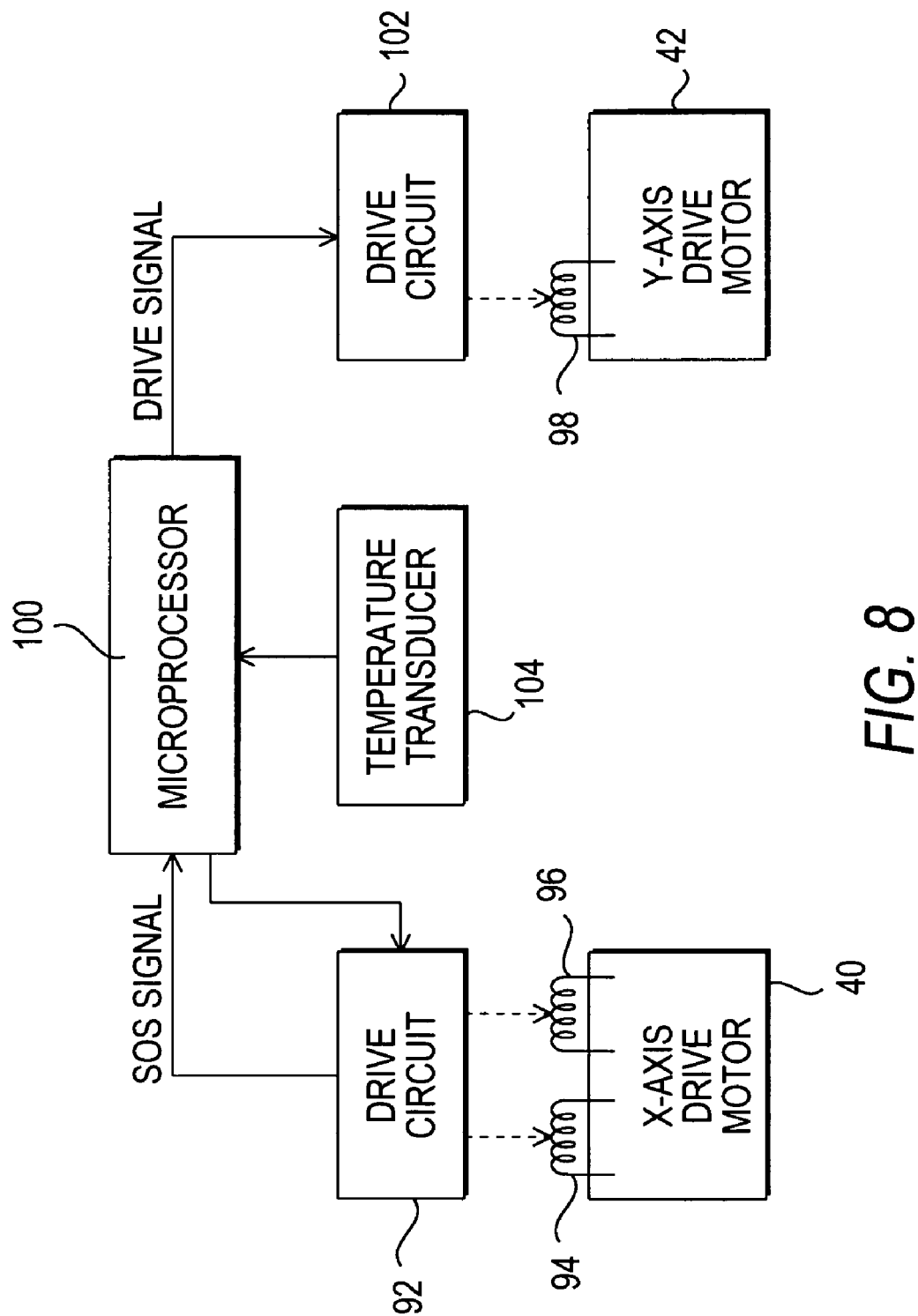
FIG. 8 is a schematic view of drive circuitry for driving the scan motors for use in the reader of FIG. 1.

FIG. 4 also depicts a first electromagnetic coil 44 for the first drive 40 and a second electromagnetic coil 46 for the second drive 42. The coils 44, 46 are mounted at the rear side of the PCB, and each has a drive winding (94, 98 as seen in FIG. 8) operative for generating an electromagnetic field in response to energization by a periodic drive signal. Coil 44 also has a feedback winding 96 whose operation is described below.

FIG. 3 shows a support chassis 48 operative for supporting the laser 32, the focusing lens assembly 33, the first drive 40, the second drive 42, and the coils 44, 46. The chassis 48 also provides shock protection and is fastened to the rear of the PCB.

Figure 6:
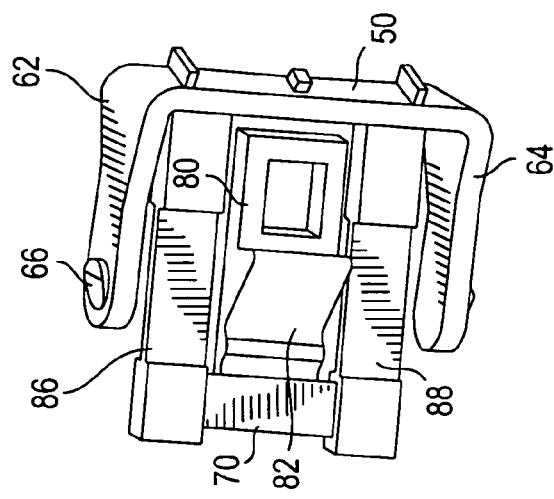
Figure 5:
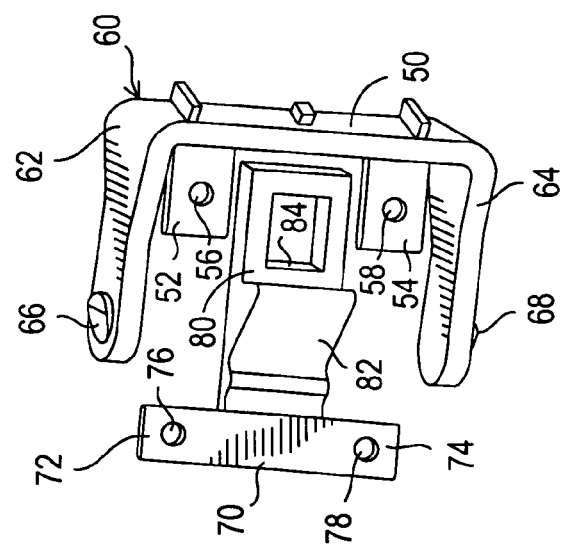

As shown in the successive views of FIGS. 5–7, either or both drives 40, 42 can be fabricated as follows: A stator 50 has a pair of stator portions 52, 54 spaced apart and symmetrically positioned relative to an axis of symmetry. The stator portions have through holes 56, 58. The stator includes a support bracket 60 having a pair of arms 62, 64 having stub shafts 66, 68. A rotor 70 has a pair of rotor portions 72, 74 spaced apart and symmetrically positioned relative to the axis of symmetry. The rotor portions have through holes 76, 78. The rotor also has an elongated central support portion 80 integral at one end therewith and extending along the axis of symmetry. The support portion 80 has an inclined mounting portion 82 at one side, and a cut-out section 84 at an opposite end thereof to reduce the mass of the support portion 80.

The rotor and the stator are separate molded resilient parts of synthetic plastic material. These parts are placed in a liquid silicon injection mold, and a pair of generally planar, elongated, leaf springs 86, 88 of silicon is overmolded onto the stator and rotor portions. Specifically, spring 86 is molded onto stator portion 52 and rotor portion 72 and enters the holes 56, 76 for a secure anchorage. Spring 88 is molded onto stator portion 54 and rotor portion 74 and enters the holes 58, 78 for a secure anchorage. The springs are thicker at their ends overlying the holes, and thinner therebetween to enable their ready flexing about an axis perpendicular to the axis of symmetry.

Figure 7:
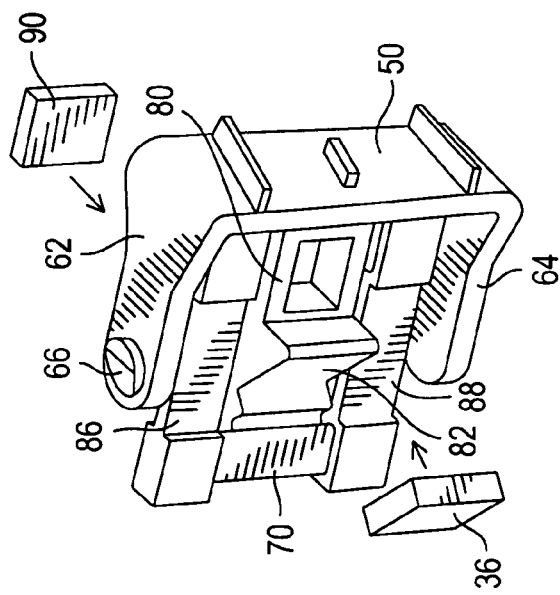
FIGS. 5, 6 and 7 are perspective views of a scan motor in successive stages of fabrication for use in the reader of FIG. 1.

As shown in FIG. 7, the first scan mirror 36, or the second scan mirror, is adhered to the mounting portion 82 at an angle of 45° relative to a common plane in which the stator portions, the rotor portions and the springs lie. At the opposite side of the support portion 80, a permanent magnet 90 is likewise adhered.

Returning to FIG. 4, the scan mirror 36 of the first drive 40 is facing upwardly, while its permanent magnet is facing the first coil 44. Also, the scan mirror of the second drive 42 is facing forwardly, while its permanent magnet 90 is facing the second coil 46. The drives 40, 42 are mounted at right angles to each other, thereby enabling the drives 40, 42 to sweep the beam in mutually orthogonal directions.

The first and second drives are each operated differently to best suit the requirements of the raster pattern. The first drive 40 is required to oscillate its scan mirror at a large scan angle, e.g., 45°, and at a high speed, e.g., 50–60 Hz, lengthwise across the symbol along the X-direction. The second drive 42 is required to oscillate its scan mirror at a small scan angle, e.g., 4°, and at a lower speed, e.g., 10 Hz, along the height of the symbol along the Y-direction. The second scan mirror needs to be larger than the first scan mirror to accommodate the moving beam. The larger inertia for the second mirror is not a problem due to its lower speed.

In accordance with this invention, the first drive 40 is operated in a self-resonating mode. As shown in FIG. 8, a bidirectional drive circuit 92 measures the natural resonant frequency of the first drive 40 and drives a drive winding 94 of the latter at or near that frequency. Driving the first drive near its natural frequency reduces the amount of power needed to drive the first drive. A suitable bidirectional drive circuit is described in U.S. Pat. No. 5,280,163, the entire contents of which are incorporated herein by reference thereto.

In addition to the drive winding 94, the coil 44 includes a feedback winding 96 operative for generating a feedback signal by the movement of the permanent magnet of the first drive 40. The drive circuit 92 uses the feedback signal to determine which direction the rotor is moving, how fast it is moving, and when it changes direction. The drive circuit 92 processes the feedback signal into a start-of-scan (SOS) signal having a square waveform which is high when the rotor is moving in one direction, low when the rotor is moving in the opposite direction, and transitions when the rotor changes direction at the end of each scan. The frequency of the SOS signal is the same as the resonant frequency of the first drive because it is generated from the feedback signal which is created by the motion of the rotor.

The multiple line raster pattern generated by the two drives 40, 42 is determined by the relative speeds and amplitudes of the motions of their rotors. It is the ratio of the frequencies of the rotors that determines the appearance of the raster pattern, not the absolute frequencies.

As mentioned, the first drive 40 operates in the self-resonating mode. However, the resonant frequency of one rotor will vary from one reader to the next due to unavoidable differences in the mass of the scan mirror 36, the magnet 90 and plastic parts, and due to differences in the stiffness of the springs 86, 88 caused, for example, by ambient temperature. It therefore becomes necessary to drive the second drive 42 in one reader at a different speed than in another reader because their first drives will not be running at exactly the same speed.

It is always possible to operate the second drive in a driven mode so that is has a desired frequency relationship with that of the first drive despite the differences mentioned above by insuring that the frequency of the second drive is derived from the frequency of the first drive. This can be done by locking the frequency of the second drive into a predetermined relationship with the frequency of the SOS signal which, as previously discussed, exactly represents the actual operating frequency of the first drive.

A microprocessor 100, preferably but not necessarily, the same one used to decode the digitized signal, has an input for receiving the SOS signal and is operative to detect when the first drive has changed direction and is starting a new scan. The microprocessor preferably has built-in digital-to-analog converters and changes the voltage at its output by a predetermined amount each time the SOS signal transitions from low to high, or from high to low. The analog output voltage can be amplified and applied through a drive circuitry 102 to a drive winding 98 of the second drive 42, thereby moving the rotor of the second drive a predetermined amount each time the SOS signal indicates that the first drive is starting a new scan.

Various kinds of raster patterns can be produced. For example, the second drive can have its rotor turned upwards by one degree for each of a first three SOS transitions, and then downwards by one degree for each of the next three SOS transitions, brining the rotor back to its original position. During the next three SOS transitions, the rotor can be turned downwards by one degree for each transition, and then upwards in one degree increments over the following three transitions. This creates a raster pattern of seven individual scan lines, which is stable and repeatable even if the first drive changes frequency because the motion of the rotor of the second drive is always synchronized with the SOS signal and the first drive.

Other kinds of raster patterns can be made by varying the amount that the output voltages changes at each transition. For example, the rotor of the second drive can move upwards by one degree as described above, but then move downwards half way between the scan lines on the way up. The raster pattern can be changed at will, or stopped altogether under predefined conditions.

The small motion of the second drive compared to that of the first drive requires a correspondingly small electrical current, thereby minimizing power consumption, even when the second drive is operated far from its resonant frequency.

If the microprocessor 100 is the same as the one responsible for decoding, then it is desirable to move the second drive only upon an SOS transition when the first drive has reached the end of its scan, and no new symbol data is being swept. The microprocessor is available for decoding the rest of the time that the laser beam is being swept across the symbol.

It may be desirable to start the second drive moving slightly before an SOS transition, because it will not move instantaneously when the drive voltage changes. The microprocessor can measure the time between scans and predict when the SOS signal is about to transition and thus change the drive voltage slightly before the SOS transition.

The second drive is driven open loop, without any feedback to assure that it is accurately tracking the drive voltage. Yet, the motor of FIGS. 5–7 has proven to be reliable and consistent, except for ambient temperature variations that can change the stiffness of the springs 86, 88. A temperature transducer 104 is connected to the microprocessor to correct the drive voltage applied to the drive winding 98 to compensate for temperature variations. If the microprocessor does not have a built-in analog-to-digital converter, then the transducer 104 can be made to produce a frequency signal that varies with temperature. The microprocessor can measure the frequency to obtain temperature information and adjust the drive voltage accordingly. The microprocessor can also correct the drive voltage applied to the drive winding 94 of the first drive to compensate for temperature variations.

It will be understood that each of the elements described above, or two or more together, also may find a useful application in other types of constructions differing from the types described above.

While the invention has been illustrated and described as embodied in synchronous and resonant drives for producing multiple scan line pattern for electro-optically reading indicia, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for scanning a target, comprising:
   a) a light source for emitting a light beam;
   b) a first resonant drive operative in a self-resonating mode for oscillating a first scan mirror to reflect the light beam from the light source along a first direction across the target at a resonant frequency;
   c) a second drive operative in a driven mode for oscillating a second scan mirror to reflect the light beam from the first scan mirror along a second direction perpendicular to the first direction at a driven frequency; and
   d) a controller operatively connected to the drives, for driving the second drive in synchronism with the first drive to produce a scan pattern of multiple scan lines across the target with a given frequency relationship between the driven frequency and the resonant frequency.

2. The arrangement of claim 1, wherein one of the drives includes a stator having a pair of stator portions symmetrically positioned relative to an axis of symmetry, a rotor having a pair of rotor portions symmetrically positioned relative to the axis of symmetry, a pair of springs extending in parallelism between the stator portions and the rotor portions, and a central portion integral with the rotor and extending between the springs.

3. The arrangement of claim 2, wherein the stator portions, the rotor portions and the springs lie in a common plane, and wherein one of the scan mirrors is mounted on the central portion at one side of the common plane at an angle of inclination relative to the common plane.

4. The arrangement of claim 3, wherein said one drive includes a permanent magnet mounted on the central portion at an opposite side of the common plane, and an electromagnetic coil having a winding for generating a periodic magnetic field which magnetically interacts with a permanent magnetic field of the permanent magnet.

5. The arrangement of claim 2, and a temperature transducer connected to the controller, for measuring changes in temperature to adjust for stiffness variations in the springs.

6. The arrangement of claim 1, wherein each drive includes a stator having a pair of stator portions symmetrically positioned relative to an axis of symmetry, a rotor having a pair of rotor portions symmetrically positioned relative to the axis of symmetry, a pair of springs extending in parallelism between the stator portions and the rotor portions, and a central portion integral with the rotor and extending between the springs.

7. The arrangement of claim 1, and a printed circuit board on which the light source, the drives and the controller are commonly mounted.

8. The arrangement of claim 7, and a handheld housing having a handle bounding an interior in which the printed circuit board is received.

9. The arrangement of claim 1, wherein the controller measures the resonant frequency of the first resonant drive and drives the first resonant drive at the resonant frequency, and wherein the controller detects reversals in direction of the first scan mirror during oscillation thereof and synchronously drives the second drive in response to said direction reversals to maintain said frequency relationship.

10. The arrangement of claim 9, wherein the first resonant drive has a feedback winding for generating a start-of-scan signal at the resonant frequency, the start-of-scan signal having transitions for said direction reversals; and wherein the controller includes a microprocessor for receiving and processing the start-of-scan signal to produce an output drive signal to drive the second drive as a function of said transitions.

11. The arrangement of claim 10, wherein the second drive is driven at each transition to produce a respective one of the scan lines.

12. The arrangement of claim 1, wherein the resonant frequency is greater than the driven frequency, and wherein the frequency relationship is a ratio of the resonant frequency to the driven frequency, and wherein the ratio is maintained constant by the controller during scanning of the target.

13. A method of scanning a target, comprising the steps of:
   a) emitting a light beam;
   b) operating a first resonant drive in a self-resonant mode to oscillate a first scan mirror to reflect the light beam along a first direction across the indicia to be read at a resonant frequency;
   c) operating a second drive in a driven mode to oscillate a second scan mirror to reflect the light beam from the first scan mirror along a second direction perpendicular to the first direction at a driven frequency; and
   d) controlling the second drive to be driven in synchronism with the first drive to produce a scan pattern of multiple scan lines across the target with a given frequency relationship between the driven frequency and the resonant frequency.

14. The method of claim 13, wherein the controlling step includes measuring the resonant frequency of the first resonant drive and driving the first resonant drive at the resonant frequency, and further includes detecting reversals in direction of the first scan mirror during oscillation thereof and synchronously driving the second drive in response to said direction reversals to maintain said frequency relationship.

15. The method of claim 14, and the step of generating a start-of-scan signal at the resonant frequency, the start-of-scan signal having transitions for said direction reversals; and the step of receiving and processing the start-of-scan signal to produce an output drive signal to drive the second drive as a function of said transitions.

16. The method of claim 15, and the step of driving the second drive at each transition to produce a respective one of the scan lines.

17. The method of claim 13, wherein the resonant frequency is greater than the driven frequency, and wherein the frequency relationship is a ratio of the resonant frequency to the driven frequency, and wherein the ratio is maintained constant during scanning of the target.

* * * * *